E. McLAUGHLIN.
SOCKET FOR AUTOMOBILE CURTAIN RODS.
APPLICATION FILED DEC. 19, 1918.

1,305,478.

Patented June 3, 1919.

Inventor,
Ewart McLaughlin
By J. Edward Maybee
Atty.

UNITED STATES PATENT OFFICE.

EWART McLAUGHLIN, OF OSHAWA, ONTARIO, CANADA.

SOCKET FOR AUTOMOBILE-CURTAIN RODS.

1,305,478.  Specification of Letters Patent.  Patented June 3, 1919.

Application filed December 19, 1918. Serial No. 267,503.

*To all whom it may concern:*

Be it known that I, EWART McLAUGHLIN, a subject of the King of Great Britain, and resident of the town of Oshawa, in the county of Ontario, Province of Ontario, Canada, have invented certain new and useful Improvements in Sockets for Automobile-Curtain Rods, of which the following is a specification.

This invention relates to means for detachably supporting on the door of an automobile a rod such as now commonly employed to carry one edge of a side curtain to facilitate the ingress and egress of passengers when the side curtains are in use. A demand exists for a simple, neat, effective and easily attached socket which can readily be fitted to any existing door as well as to new work, and the object of the present invention is to provide such a socket.

I attain my object by means of the constructions hereinafter described and illustrated in the accompanying drawings in which—

Figure 2:
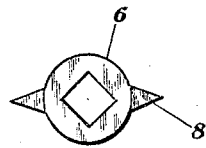
Figure 3:
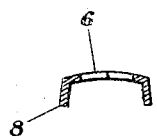
Figure 6:
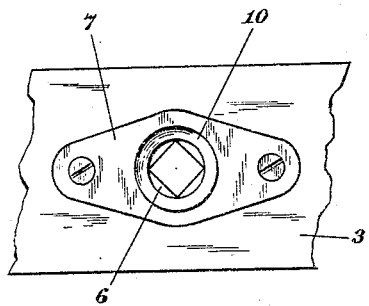
Figure 1:
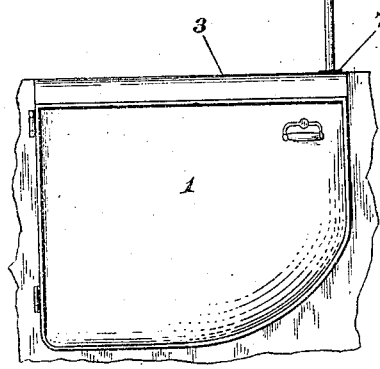
Figure 5:
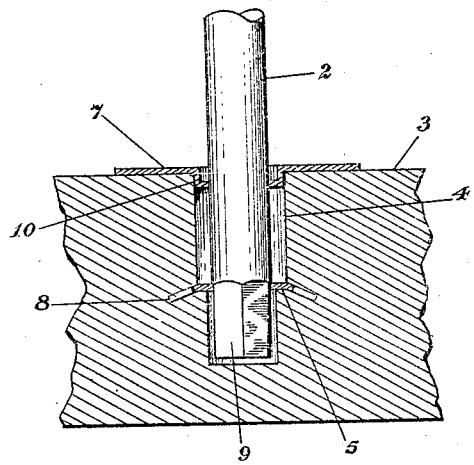
Figure 4:
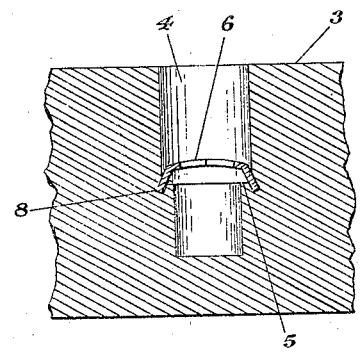

Figure 1 is a side elevation showing the door of an automobile with a curtain rod in place;

Fig. 2 a plan view of the base socket member as it appears when first stamped from the sheet;

Fig. 3 a cross section of the same bent up ready for insertion in a wooden door member;

Fig. 4 a cross section of a wooden door member showing the base socket member partly inserted;

Fig. 5 a cross section of the completed socket with the curtain rod shown in position; and Fig. 6 a plan view of the completed socket.

In the drawings like numerals of reference indicate corresponding parts in the different figures.

1 is an automobile door and 2 a curtain rod. The upper edge of the door frame is commonly formed with a wooden member 3. This member has a recess 4 formed therein, which recess is counterbored to form a shoulder 5. The metal parts of the socket comprise a base socket member 6 and an escutcheon 7. The base socket member is formed in the first place as a circular washer with radially extending pointed prongs 8. The hole in the washer is preferably square in plan to fit the squared end 9 of the curtain rod, and the diameter of the washer is slightly greater than that of the wider part of the recess.

After the base socket member is formed, it is bent up substantially to the form shown in Fig. 3 so that it may be readily inserted through the open upper end of the recess 4 with the ends of its prongs engaging in the angle of the shoulder 5. A suitable tool is placed in the recess and driven down by a hammer. This causes the prongs to enter the wood probably more or less laterally as shown in Fig. 5. The central part of the socket member is then flattened out and brought down firmly in contact with the shoulder which action forces the edges of the socket member to penetrate the wood member. The socket member is thus securely held in place and with its openings axially alined with the recess and prevented from turning or being withdrawn by a tight fitting curtain iron.

The escutcheon 7 is provided with screw holes whereby it may be secured in position and is stamped out to form a central portion 10 adapted to snugly fit in the open end of the recess 4. In this central part is formed a round hole of a size corresponding to the diameter of the curtain rod to be employed. As the hole in the portion 10 is easily made exactly co-axial with the recess, the curtain rod will be supported in perfect axial alinement with the recess so that if the latter be accurately bored the curtain rod will always be supported exactly perpendicular to the member 3, or, if desired, at an angle thereto.

From the above description it will be seen that I have devised a socket which will satisfactorily attain the objects of my invention as set out in the preamble of this specification.

What I claim as my invention is:

1. A socket comprising a wooden member having a recess therein counterbored to form a shoulder intermediate its ends; a base socket member engaging said shoulder and provided with prongs extending into the sides of the recess; and an escutcheon fitted about the outer end of the recess.

2. A socket comprising a wooden member having a recess therein counterbored to form a shoulder intermediate its ends; a base socket member engaging said shoulder having a square hole formed therein and provided with prongs extending laterally into the sides of the recess: and an escutcheon fitted about the outer end of the recess and having a round hole formed therein in alinement with the hole in the base socket member.

3. A socket comprising a wooden member having a recess counterbored therein to form a shoulder intermediate its ends; a base socket member engaging said shoulder and having its edges embedded in the sides of the recess.

4. A socket comprising a wooden member having a recess counterbored therein to form a shoulder intermediate its ends; a base socket member engaging said shoulder and having its edges embedded in the sides of the recess and provided with prongs extending into the shoulder.

Signed at Toronto, Canada, this 6th day of December, 1918.

EWART McLAUGHLIN.

Copies of this patent may be obtained for five cents each, by addressing the "Commissioner of Patents, Washington, D. C."